UNITED STATES PATENT OFFICE.

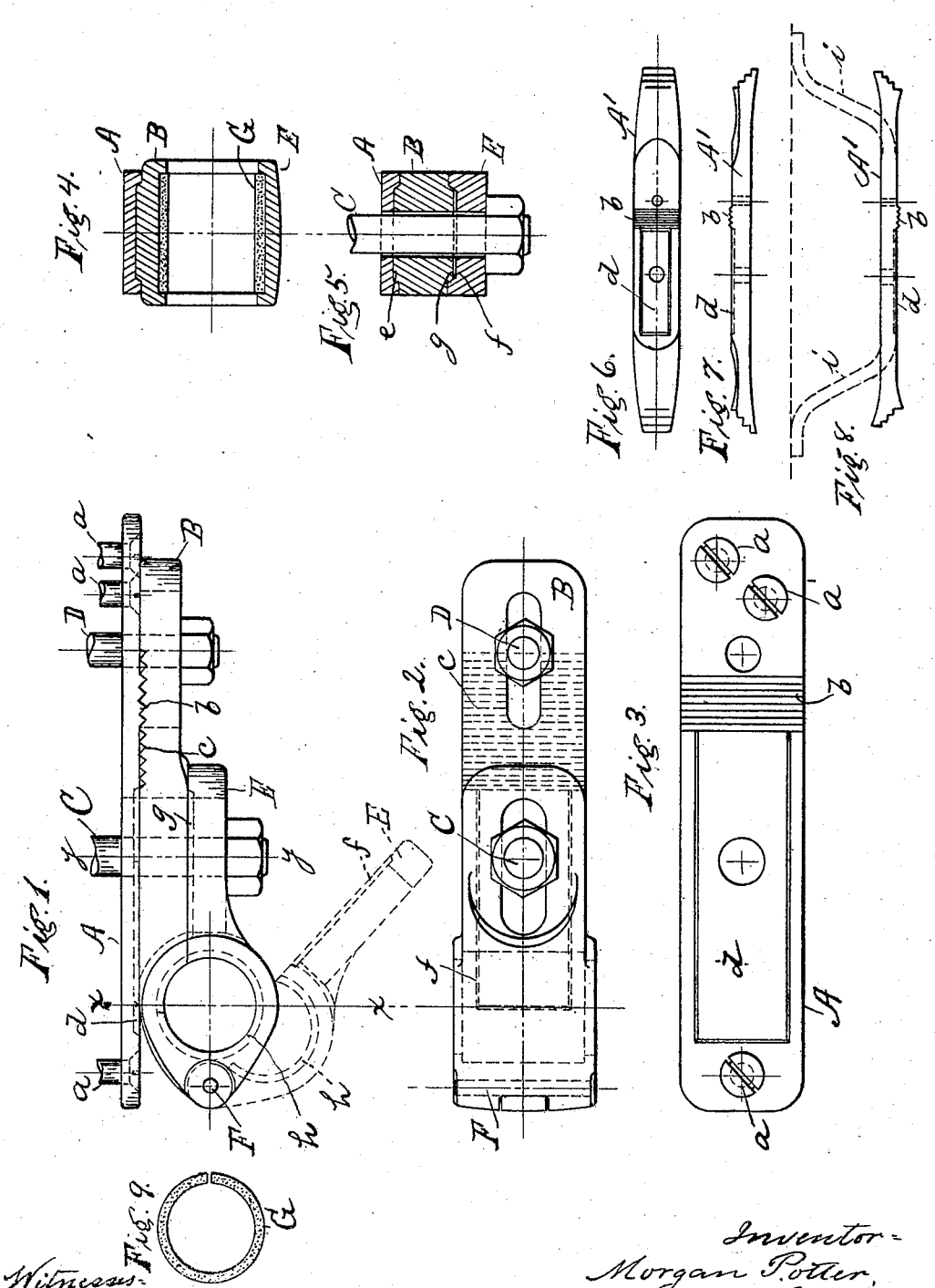

MORGAN POTTER, OF FISHKILL-ON-THE-HUDSON, NEW YORK, ASSIGNOR TO MORGAN POTTER COMPANY, OF FISHKILL-ON-THE-HUDSON, NEW YORK, A CORPORATION.

HANGER FOR VEHICLE-BRAKE SHAFTS.

No. 800,395. Specification of Letters Patent. Patented Sept. 26, 1905.

Application filed February 25, 1905. Serial No. 247,234.

*To all whom it may concern:*

Be it known that I, MORGAN POTTER, a citizen of the United States, residing at Fishkill-on-the-Hudson, in the county of Dutchess and State of New York, have invented certain new and useful Improvements in Hangers for Vehicle-Brake Shafts, of which the following, taken in connection with the accompanying drawings, is a full, clear, and exact specification, sufficient to enable others skilled in the art to make and use the same.

The object of my invention is to provide a simple, cheap, and effective hanger for shafts of vehicle-brakes, which hanger may be easily applied in place, be strong and durable and efficient for the purposes intended, and wherein provision is made for adjustment of the hanger to vary the location of the shaft without detracting from its security in the position to which adjusted, and wherein especial provision is made for preventing lateral movements of the hanger upon its seat and of one part with respect to the other, and wherein compensation may easily be made for any wear of the shaft in its bearing or wear of the bearing.

To accomplish the foregoing object and to secure other and further advantages in the matters of construction, operation, application, and use, my improvements involve certain novel and useful peculiarities of construction, relative arrangements or combinations of parts, and principles of operation, all of which will be herein first fully described and then pointed out in the claims.

In the accompanying drawings, forming part of this specification, Figure 1 is a view in side elevation of my improved hanger for vehicle-brake shafts shown as applied to the bed-piece or foundation and locked thereon and in connection therewith in accordance with my invention, the hinged portion of the hanger being shown in dotted lines as dropped down, so as to admit the shaft or permit its removal. Fig. 2 is a plan view of the under side of the hanger shown in Fig. 1, but detached from the seat or foundation-piece. Fig. 3 is a plan view of the under side of the foundation-piece shown in Fig. 1 and ready to receive the hanger and the bolts for locking the latter in place. Fig. 4 is a cross-section and elevation on a plane through line $x\,x$ of Fig. 1. Fig. 5 is a cross-section and elevation on a plane through line $y\,y$ of Fig. 1. Fig. 6 is a plan of the foundation-piece, on a smaller scale than in previous figures, showing the form adopted when the same is required to be lengthened out or otherwise changed in form to adapt it for application to the woodwork or other portion of a vehicle which will not conveniently receive the flat straight seat or bed-piece. Fig. 7 is a side elevation corresponding with Fig. 6. Fig. 8 is also a side elevation showing the bed-piece and by dotted lines the manner in which its extremities may be lengthened and adapted to be applied at a distance from the body or other portion of the vehicle, as when it is required to straddle some obstruction to the application of the flat straight bed-piece or when it may be necessary to vary the vertical distance between the shaft-hanger and the body of the vehicle. Fig. 9 is a cross-section showing a leather or other gasket which may be employed in the hanger to receive the brake-shaft and prevent rattling therein or undue wear thereof.

In all the figures like letters of reference wherever they occur indicate corresponding parts.

A is the seat or bed-piece or foundation-piece, which receives the hanger and which is to be secured to a suitable part of the vehicle, as by screws or bolts $a\,a$. This piece is preferably made of malleable metal, and it is provided on its under side with a series of serrations (represented at $b$) extending across the width of the bed-piece and calculated to interlock with a correspondingly-serrated portion of the hanger, (represented at $c$.) The under side of the piece A is also recessed, as at $d$, to receive a corresponding projection $e$ on the main portion of the hanger.

B is the main portion of the hanger, which is intended to be applied against the under side of the bed-piece, as indicated. The serrations $c$ on this part are more numerous than those at $b$ on the bed-piece, so that the hanger may be adjusted back and forth through a considerable distance on the bed-piece, and yet be held as firmly in connection with it at one point as at another. The part B is also provided with elongated openings to receive the bolts C and D, by which the hanger is to be finally locked in place. The elongated openings admit of the adjustment of the body of the hanger back and forth in the direction of its length, as above referred to.

E is a hinged portion of the hanger, the same being mounted on the body B, as by a hinge at F, of ample strength and having an elongated slot to receive the bolt C.

The hanger encompasses the shaft when the parts are closed together, as in Fig. 1, and the hanger being set so that the axis of the shaft shall lie in the desired position the nuts on the bolts C and D are firmly tightened, and the hanger is then ready for operation.

To vary the operation of the shaft, the nuts on bolts C and D have only to be loosened sufficiently to enable the two sets of serrations to ride over each other to the proper point, when they may be again tightened up, and the shaft will remain in the position to which adjusted.

To prevent lateral movement of the hinged portion of the hanger with respect to the main portion, the hinged portion is recessed, as at f, and the main portion has a projection, as at g, fitted to enter this recess. This projection being of considerable length effectively prevents sidewise movement of the hinged piece E when the latter is properly closed against the main portion.

Of course the hanger may be applied directly on the shaft without any intervening ring or packing; but I prefer to provide the hanger with a recess (represented at h) and to supply this recess with a short cylinder of leather or equivalent material, (represented at G,) this to take the wear due to the movements of the brake-shaft. This packing G will ordinarily be used in connection with the better class of vehicles, on which it may be desirable to reduce the rattle which might be otherwise occasioned by movement of the shaft in its bearings.

The packing is in the form of a cylinder, split or open on one side, and may be easily removed from the recess and replaced whenever required.

The projection g is preferably made so that it does not quite reach to the bottom of the recess f, as shown in Fig. 5. The purpose of this arrangement is to enable one to conveniently adjust the hanger to fit tightly around the shaft by simply filing away the edges around the recess f to enable the hinged part E to be brought farther up against the main portion B.

The flat and straight foundation-piece (represented at A) is not always applicable, owing to the variations in construction of different vehicles, and I therefore propose to supply with the improved hanger a foundation-piece which may be easily added to at the end in order that it may be properly secured in connection with the vehicle. In Figs. 6, 7, and 8 such a foundation-piece is represented at A'. It is supplied with serrations b and with a recess d and with bolt-holes to receive the hanger, as in Fig. 1; but its ends are stepped or otherwise fashioned, so that it will be easy and convenient to weld upon them additional lengths of metal, as may be required for the piece of work in hand. Such additional pieces are shown by dotted lines at i i, Fig. 8, and these may be bent in any preferred way and secured to the vehicle as may be desired. This affords opportunity to pass any obstruction or reach around it, and it also affords opportunity to set the hanger at the desired distance from the body of the vehicle. For the form of bed-piece shown in Figs. 6, 7, and 8 I employ metal suitable for welding.

The parts being constructed and arranged substantially as above described will be found to admirably answer all the purposes or objects of the invention hereinbefore alluded to.

Having now fully described my invention, what I claim as new herein, and desire to secure by Letters Patent, is—

1. In a hanger for a vehicle-brake shaft, the foundation-piece adapted to be secured to the body of the vehicle, the same being serrated and provided with an elongated recess and combined with the body of the hanger having corresponding serrations and a projection to enter said elongated recess, substantially as and for the purposes set forth.

2. In a hanger for a vehicle-brake shaft, the combination with the bed-piece or foundation provided with an elongated recess, of the body of the hanger having elongated slots and a projection to enter the recess, and the coupling-bolts passing through said slots, the foundation-piece and the body of the hanger being each provided with interlocking serrations, substantially as and for the purposes set forth.

3. In an adjustable hanger of the character herein set forth, the combination with the body of the hanger, of the hinged piece mounted in connection with the body, and the coupling-bolts, the said hinged piece being slotted to receive one of the coupling-bolts which passes through the body and through the hinged piece and having a recess therein, and the body provided with a projection to enter said recess, substantially as and for the purposes set forth.

4. In a hanger for a vehicle-brake shaft, the combination with the body of the hanger, of the hinged piece, the body being provided with an elongated projection and the hinged piece with a corresponding recess to receive said projection, substantially as and for the purposes set forth.

5. In an adjustable hanger for a brake-shaft, the combination with the main body of the hanger having a recess, of the hinged piece applied in connection with said body and having a recess, and a short packing located in the two recesses and removable therefrom, substantially as and for the purposes set forth.

In testimony whereof I have signed my name to this specification in the presence of two subscribing witnesses.

MORGAN POTTER.

Witnesses:
M. E. CURTISS,
J. B. CAMMACK.